Patented Dec. 9, 1952

2,621,166

UNITED STATES PATENT OFFICE 2,621,166

SYNTHETIC POLYMERS

Friedrich Wilhelm Schmidt, Leverkusen-Wiesdorf, and Karl Erwin Müller, Leverkusen-Bayerwerk, Germany, assignors to Farbenfabriken Bayer, Leverkusen, Germany, a manufacturing and trading organization of Germany No Drawing. Application July 2, 1949, Serial No. 102,942. In Germany February 23, 1949

12 Claims. (Cl. 260—75)

The present invention relates to a process of producing modified-synthetic-polyesters and more particularly it relates to a process where a polyester is reacted with an excess of diisocyanate, the resultant modified polyester being further reacted with a polyfunctional compound such as water, polyvalent alcohols, polyvalent amines or amino-alcohols.

In a prior process which is not claimed herein valuable elastic polymers are obtained by reacting polyesters with an excess of diisocyanate and subsequently introducing urea cross links. The introduction of urea groups can be effected either by reacting the surplus of isocyanate groups with water whereby carbon dioxide is developed or by a purely additive reaction with amines or diamines respectively. It is believed that, simultaneously with the introduction of the urea group and the prolongation of the polyester-isocyanate-chains effected thereby, a reaction between the urea groups and the isocyanate groups not used up for urea formation occurs. The hitherto linear chains are thereby cross-linked in a short space of time, and the polyesters lose their fusible character. To apply a term used in the rubber industry, the product is vulcanized. The cross linking reaction leads to crumbly products, which must be worked up to rubber-elastic structures inside a few hours—before the final degree of cross linking or vulcanization is attained, a state which is quickly reached owing to the high reactivity of the excess isocyanate groups. If diamines are employed for the formation of the urea groups, the shaping process may be entirely impossible unless special precautions are taken by suitably selecting the diisocyanates and the diamines.

A further possibility of modifying polyesters reacted with diisocyanates consists in the reaction of the isocyanate end-groups with divalent alcohols to form urethanes. (Compare copending application Serial No. 70,598 of Müller et al. filed January 12, 1949.)

In this case also a cross linking of the linear macromolecules and formation of the rubber-elastic state is effected, since the amount of glycol remains below or is at most equal to the amount equivalent to the excess isocyanate groups. In this case, however, cross linking occurs much more slowly than in the case of water or amines. Inside a few days the reaction is brought to its final state, and the reaction product can then no longer be molded or shaped without difficulty. This process therefore has special uses in the casting of rubber-elastic structures.

The processes described above lead accordingly to valuable rubber-elastic products which all possess, however, the disadvantage of a limited time in which they can be further treated. Only small batches can therefore be made and storing and shipping to remote factories is impossible.

It is therefore an object of the present invention to provide isocyanate modified rubber-elastic polyesters which may be stored indefinitely and which may be finally shaped by pressing at any time desired.

A further object resides in the provision of an improved and simplified process of producing rubber-elastic synthetic polymers.

Further objects will become apparent as the following specification proceeds.

The above objects are accomplished by reacting the linear or substantially linear polyesters modified with diisocyanates—which polyesters consist at least mainly of aliphatic dicarboxylic acids and glycols—with polyfunctional compounds in an amount equivalent or more than equivalent with relation to the free isocyanate groups. If in the foregoing we speak of substantially linear polyesters we want to make it clear that, contrary to prior experiences, in the case of this invention a slight digression from the strictly linear structure may be accepted. For instance polyesters may be used in which, apart from say 27 molecules of a bifunctional alcohol, 1 molecule of a trifunctional alcohol has been employed.

The linear polyesters which are primary starting materials for our present invention are preferably made from saturated aliphatic compounds at least for the most part. As acids there will be mentioned: malonic acid, succinic acid, adipic acid, methyladipic acid, maleic acid, carbonic acid, dihydromuconic acid, thiodipropionic acid, diethylether-dicarboxylic acid, sebacic acid, suberic acid, and higher dicarboxylic acids. As glycols there may be mentioned: ethylene glycol, 1.2-propylene glycol, 1.3-propylene glycol, 1.3-butylene glycol, 1.4-butylene glycol, 1.6-hexane diol, methyl hexane-1.6-diol, 1.4-butene diol, diethylene glycol, thiodiglycol, 2,2'-dimethyl-1.3-propylene glycol. Hydroxy carboxylic acids can also be used in the preparation of polyesters, provided however, that the tendency thereof of polycondensation is stronger than the tendency of ring formation and that sufficient glycols are present to secure formation of hydroxyl end-groups. Moreover, mixtures of various acids and glycols can be used, mixed polyesters being obtained thereby. Other bifunctional reactants which are complementary to the acids and glycols can be used in smaller proportions. As examples there are mentioned compounds containing aromatic nuclei, such as phthalic acid or terephthalic acid, aromatic or aliphatic diamines, for instance, phenylene diamines, naphthylene diamines, piperazine, ethylene diamine as well as amino alcohols, for instance, amino propanol and hydroxyethylaniline. Polycondensation of the reactants is effected by heating to 100–250° C. Care must be taken that, owing to a slight excess of glycols and to a sufficiently long heating, the polyester has practically no acid value. The OH-value must be between about 20 and about 80, preferably between 40 and 60. That corresponds to a percentage of OH-groups of 0.6–2.4, preferably 1.2–1.8 by weight. Prior to the reaction with diisocyanates the polyesters thus obtained must be freed from water by heating to 100–150° C. in vacuo or by introducing inert gases at the same temperature. Among the acids preference is given to adipic acid, and among the glycols to ethylene glycol and 1.2-propylene glycol.

For converting the polyesters into the diisocyanate modification products thereof care must be taken that the diisocyanates are used in excess over the OH-groups. The excess must be within the limits of 20–250%, preferably 50–100%, over the amount which is necessary for combining with the OH-groups. Owing to the reaction which occurs in this step, the OH end-groups of the polyesters are converted into NCO end-groups. Moreover, depending on the excess of diisocyanates, several polyester units can be linked together. In the case of a smaller excess up to 3 units may be linked, whereas in the case of larger excess no chain lengthening occurs at all. In case the diisocyanate excess is more than 100% there will even remain some free diisocyanates in the mix. Aromatic diisocyanates are preferred and among them those of the polycyclic series, as they have a certain "spaciousness," confer some rigidity to the structure and cause separation of the adjacent chains. In the first line, naphthylene-1.5-diisocyanate is to be mentioned. Furthermore, the other naphthylene diisocyanates can also be used as well as diisocyanates of the diphenyl series, for instance, 3.3'-dichlorodiphenyl-4.4'-diisocyanate, and the diisocyanates of the pyrene, fluorene and chrysene series. Reaction of the polyester with the diisocyanate is performed at temperatures of 80–150° C. in the absence of moisture.

In the next step this diisocyanate modified polyester is caused to react with a polyfunctional compound which is either a glycol, a diamine or an amino-alcohol, in short a compound containing two or more hydroxy and/or amino groups.

Suitable polyfunctional compounds of this sort are for instance: water, ethylene-glycol, quinite, 1.4-butylene-glycol, tri-methylolopropane, hexanetriol, amino-ethyl-alcohol, 2.2-dimethyl-propanol-amine-1.3-diethanol-amine, 3-aminocyclo-hexanol, p-aminophenyl-ethyl-alcohol, 3.3'-dichloro-benzidine or p,p'-diamino-diphenyl-methane.

Mixtures of these compounds may also be employed e. g. a mixture of equal parts of 1.4-butylene glycol and 1.4-butylene diamine. The polymers so obtained can be kept unchanged for an indefinite period and may be worked up and shaped on the machines usual in the rubber industry at any time. Before finally shaping them these modified polyesters are mixed again with small amounts of polyfunctional isocyanates which step is carried out on cooled rollers.

In this case it is not essential for the polyfunctional isocyanates to be of a bifunctional nature.

Apart from the diisocyanates mentioned above, such as toluylenediisocyanate, naphthylene diisocyanate, or the like, tri-isocyanates and isocyanates of a still higher functionality may be used, such as for instance triphenylmethanetriisocyanate. After the polyfunctional isocyanates have been added, the final shaping operation must follow immediately, a step which is preferably carried out in a heated press. The final cross linking or vulcanization occurs at this stage by the reaction of the polyfunctional isocyanates with active hydrogen atoms. The mechanical data of the end-products such as tensile strength, elongation, load, hardness, may be varied considerably with the amounts and nature of polyfunctional isocyanates employed.

The new elastic diisocyanate modified polyesters may be employed for all kinds of uses where elasticity, resistance to chemicals and to swelling is desirable. They may be made into bicycle tires, soles for shoes and boots, balls for golf, tennis and other purposes, packing materials and the like. This enumeration is by no means limitative to the uses to which the new polymeric products can be put, since other modes of employment will be obvious to those skilled in the art especially in connection with the mechanical data given in the following examples.

*Example 1*

1000 parts of a glycol adipic acid polyester of the acid value 1 and of the OH-value 53 (corresponding to 1.6% OH) are freed from small amounts of absorbed atmospheric moisture in a stirring vessel at 130° C. and under a pressure of 12 mm. 160 parts of 1.5-naphthylene diisocyanate are added thereto at the same temperature. The temperature first drops to 120° C. owing to the cold isocyanate and presently rises to 138° C. Heating is now interrupted and the temperature drops to 130° C. within 6 minutes. 16.5 parts of amino-ethyl alcohol are then added at once and the mix is stirred until the stirrer can hardly be moved any longer owing to solidification of the contents of the vessel. The contents of the stirring vessel is put into a flat dish coated with petroleum jelly and, after two hours, is rolled into a sheet. After one day, 200 parts each of the sheet are thoroughly mixed by passing them through a pair of water-cooled friction rollers with (a) 4 parts, (b) 6 parts, (c) 8 parts of 1.5-naphthylene diisocyanate and then pressed during 15 minutes at 150° C. into 4 mm. thick rubber-like plates, the mechanical data obtained being the following:

|  | (a) | (b) | (c) |
|---|---|---|---|
| Tensile strength (pounds/inch²) | 1,778 | 1,862 | 2,097 |
| Elongation at break (percent) | 730 | 650 | 790 |
| Load at 300% elongation | 62 | 70 | 70 |
| Permanent set (percent) | 50 | 36 | 26 |
| Resiliency: | | | |
| at 20° C | 55 | 57 | 56 |
| at 70° C | 62 | 64 | 65 |
| Hardness | 65 | 66 | 66 |
| Tear resistance (pounds/inch²) | 1,015 | 1,309 | 1,197 |

Twenty days later, another 200 parts of the sheet and 6 parts of 1.5-naphthylene diisocyanate are mixed and pressed as described in the foregoing. The mechanical properties obtained are the following:

| | |
|---|---:|
| Tensile strength (pounds/inch²) | 1876 |
| Elongation at break (percent) | 690 |
| Load at 300% elongation | 76 |
| Permanent set (percent) | 20 |
| Resiliency: | |
| At 20° C | 56 |
| At 70° C | 64 |
| Hardness | 74 |
| Tear resistance (pound/inch²) | 1400 |

*Example 2*

A mixture of 700 parts of glycol adipic acid ester with the acid value 1 and the OH-value 53 and 300 parts of 1.2-propylene glycol adipic acid ester with the acid value 0.5 and the OH-value 48 are reacted with 170 parts of 1.5-naphthylene diisocyanate as described in Example 1 and 20 parts of amino ethyl alcohol are stirred into this mix. The solidified mass is rolled into a sheet which is stored for 20 days. After this time, 100 parts each thereof are mixed on the cold roller with (a) 2 parts, (b) 3 parts, (c) 4 parts of 1.5-naphthylene diisocyanate and pressed at 150° C. The mechanical data obtained are as follows:

| | (a) | (b) | (c) |
|---|---:|---:|---:|
| Tensile strength (pounds/inch²) | 1,785 | 2,114 | 2,191 |
| Elongation at break (percent) | 710 | 710 | 655 |
| Load at 300% elongation | 75 | 91 | 70 |
| Permanent set (percent) | 22 | 18 | 16 |
| Resiliency: | | | |
| at 20° C | 47 | 46 | 46 |
| at 70° C | 61 | 62 | 63 |
| Hardness | 72 | 75 | 76 |
| Tear resistance (pounds/inch²) | 875 | 1,071 | 1,197 |

*Example 3*

A mix of 700 parts of ethylene glycol adipic acid polyester with 300 parts of propylene glycol adipic acid polyester is reacted under the same conditions as in Example 2 with 120 parts of 1.5-naphthylene diisocyanate and subsequently with 6 parts of amino-ethyl-alcohol. After 6 weeks, 200 parts each of the product thus obtained are pressed in a hot state (a) without any addition of isocyanate, (b) mixed with 2%, (c) mixed with 3%, (d) mixed with 4% of 1.5-diisocyanate. The mechanical properties obtained are the following:

| | (a) | (b) | (c) | (d) |
|---|---:|---:|---:|---:|
| Tensile strength (pounds/inch²) | 742 | 986 | 1,442 | 1,820 |
| Elongation at break (percent) | 1,005 | 838 | 825 | 813 |
| Load at 300% elongation | 25 | 26 | 33 | 43 |
| Tear resistance (pounds/inch²) | 87 | 264 | 496 | 615 |
| Resiliency: | | | | |
| at 20° C | 43 | 47 | 52 | 54 |
| at 70° C | 35 | 43 | 50 | 62 |

*Example 4*

62 parts of toluylene diisocyanate are added at once at 130° C. to 500 parts of a 1.5% hydroxyl groups containing polyester obtainable from 438 parts of adipic acid and 202 parts of ethylene glycol by thermal esterification. When heating is interrupted the temperature rises to 140° C. owing to the heat of reaction and then drops again. At 128° C. 8.25 parts of amino-ethyl-alcohol are quickly run into the liquid mixture which is further stirred until it has become tough. The reaction product is taken out of the vessel, stored in lumps over night and is made into a sheet on the roller the next day. After 10 weeks, 3 parts of 1.5-naphthylene diisocyanate are mixed with 100 parts each of the sheet on a pair of cold friction rollers and the whole mass is pressed into golf balls which are distinguished by excellent properties.

| | |
|---|---:|
| Tensile strength (pound/inch²) | 2240 |
| Elongation at break (percent) | 797 |
| Tear resistance (pounds/inch²) | 553 |
| Hardness | 53 |
| Load at 300% elongation | 32 |

*Example 5*

20 parts of amino-ethyl-alcohol as used in Example 2 are replaced by 28 parts of 2.2-dimethyl-propanol-amine-1.3, the other properties of ingredients and processing conditions being the same as described in Example 2. After 3 weeks, the product obtained is mixed on the roller with 3% of 1.5-naphthylene diisocyanate and pressed into profiled boot soles which have proved to be far superior to soles made of best leather. Such boot soles exhibit the following properties:

| | |
|---|---:|
| Tensile strength (pounds/inch²) | 1820 |
| Elongation at break (per cent) | 810 |
| Resiliency at 20° C | 43 |
| Hardness | 57 |
| Tear resistance (pounds/inch²) | 525 |

*Example 6*

A mix of 600 parts of ethylene-glycol-adipic-acid-polyester with 400 parts of propylene-glycol-adipic-acid-polyester is caused to react at 130° C. first with 160 parts of 1.5-naphthylene-diisocyanate and subsequently with 36 parts of p-amino-phenyl-ethyl-alcohol. The thermoplastic reaction product thus obtained can be stored for an indefinite period. It can be pressed into moulded articles with rubber-elastic properties, if desired after mixing with more diisocyanate.

| | |
|---|---:|
| Tensile strength (pounds/inch²) | 1960 |
| Elongation at break (per cent) | 785 |
| Load at 300% elongation | 60 |
| Tear resistance (pounds/inch²) | 112 |
| Hardness | 66 |
| Resiliency: | |
| At 20° C | 49 |
| At 70° C | 60 |
| Permanent set (per cent) | 16 |

*Example 7*

In the process described in Example 2 amino-ethyl-alcohol is replaced by 34 parts of trimethylolpropane. A final product is obtained which, after storing for several weeks, is made into packing rings which are highly resistant to swelling in liquid aliphatic hydrocarbons.

| | |
|---|---:|
| Tensile strength (pounds/inch²) | 1190 |
| Elongation at break (per cent) | 360 |
| Load at 300% elongation | 112 |
| Tear resistance (pounds/inch²) | 350 |
| Hardness | 68 |
| Resiliency at 20° C | 40 |

*Example 8*

1000 parts of the modified polyester used in Example 2 are caused to react at 130° C. with 140 parts of 1.5-naphthylene-diisocyanate. 33 parts of quinite are stirred at 125° C. into the mix until the whole has become quite tough. The reaction product thus obtained is taken out of the reaction vessel and, after two hours, can be made into a sheet on the roller which is stored for 70 days. After incorporating therewith 5% of 1.5-naphthylene-diisocyanate the sheet is pressed into rubber-elastic moulded articles which are resistant to ozone.

| | |
|---|---|
| Tensile strength (pounds/inch²) | 908 |
| Elongation at break (per cent) | 625 |
| Tear resistance (pounds/inch²) | 406 |
| Resiliency at 20° C | 46 |

*Example 9* p-Amino-phenylethyl-alcohol of Example 2 is replaced by 59 parts of 3.3'-dichlorobenzidine, the other proportions of ingredients and conditions remaining unchanged. The reaction product is made into a sheet and stored. After incorporating therewith 3% of 1.5-naphthylene-diisocyanate it is pressed into a bicycle tire without fabric, having the following mechanical data:

| | |
|---|---|
| Tensile strength (pounds/inch²) | 1720 |
| Elongation at break (per cent) | 385 |
| Load at 300% elongation | 182 |
| Tear resistance (pounds/inch²) | 1050 |
| Hardness | 76 |
| Resiliency: | |
| At 20° C | 51 |
| At 70° C | 68 |
| Permanent set (per cent) | 6 |

*Example 10*

130 parts of toluylene-diisocyanate are stirred at 130° C. into 1000 parts carefully dehydrated glycol-adipic-acid-polyester the temperature being kept at 130° C. for 20 minutes. 30 parts of toluylene-diamine (-1.2.4.) are then added to the mixture which is stirred until it solidifies. The reaction product thus obtained is made into a sheet on the roller and stored for 6 weeks. 2 parts of toluylene-diisocyanate are then mixed on the roller with 100 parts each of the sheet and the material obtained is pressed at 150° C. during 15 minutes into a 4 mm. thick plate, having the following mechanical data:

| | |
|---|---|
| Tensile strength (pounds/inch²) | 1890 |
| Elongation at break (per cent) | 650 |
| Load at 300% elongation | 62 |
| Tear resistance (pounds/inch²) | 1020 |
| Hardness | 69 |
| Resiliency at 20° C | 52 |
| Permanent set (per cent) | 20 |

*Example 11*

A plasticizer consisting of 50 parts of active carbon black and 100 parts of thiodiglycolic acid dibutyl ester is added to 1000 parts of the polyester mix as used in example 2. The whole is caused to react at 120° C. while stirring with 160 parts of 1.5-naphthylene-diisocyanate. The temperature rises up to 134° C. When it has dropped again to 120° C. a mixture of 8 parts of aminoethyl-alcohol and 16 parts of quinite heated to 100° C. are added. After a minute, the highly viscous material is cast into a flat dish and stored. After storing for an indefinite period 3% of 1.5-napthylene-diisocyanate are added and the solid reaction product can be pressed at 160° C. into buffers. The mechanical properties obtained are as follows:

| | |
|---|---|
| Tensile strength (pounds/inch²) | 1720 |
| Elongation at break (per cent) | 670 |
| Load at 300% elongation | 62 |
| Tear resistance (pounds/inch²) | 728 |
| Hardness | 59 |
| Resiliency: | |
| At 20° C | 46 |
| At 70° C | 62 |
| Permanent set (per cent) | 13 |

*Example 12*

A mixture of 650 parts of adipic-acid-ethylene-glycol-polyester (OH-value 51, acid value 0.8) and 350 parts of adipic-acid-propylene-glycol-polyester (OH-value 49, acid value 1.2) is dehydrated for half an hour in a stirring vessel which is evacuated to a pressure of 14 mm. Hg. It is then reacted at the same temperature with 120 parts of 1.5-naphthylene-diisocyanate. The viscosity of the reaction product increases considerably. After completion of the exothermic reaction apparent from the slow falling off of the temperature there are added 8 parts of water which reacts with the excess isocyanate groups forming carbon dioxide. The viscosity increases still further. When the stirrer can hardly any longer be moved the reaction product is taken out and subsequently pressed into a 3 mm. thick, handy sheet which is capable of being stored. After 15 days, (a) 2%, (b) 4%, (c) 6% of 1.5-naphthylene-diisocyanate are added to the sheet and the stock obtained is then pressed at 155° C. during 20 minutes into plates, the mechanical properties obtained being the following:

| | (a) | (b) | (c) |
|---|---|---|---|
| Tensile strength (pounds/inch²) | 1,140 | 1,360 | 1,490 |
| Elongation at break (percent) | 500 | 500 | 498 |
| Load at 300% elongation | 70 | 87 | 105 |
| Tear resistance (pounds/inch²) | 810 | 903 | 938 |
| Resiliency: | | | |
| at 20° C | 59 | 60 | 58 |
| at 70° C | 62 | 66 | 64 |
| Hardness | 62 | 64 | 67 |
| Permanent set (percent) | 17 | 11 | 11 |

We claim:

1. A process for producing a shaped, vulcanized elastomer, which comprises admixing (1) a stable, unvulcanized elastomer obtained by the reaction of (a) an isocyanate modified polyester prepared from an anhydrous, substantially linear dicarboxylic acid-dihydric alcohol-polycondensation product having as sole reactive groups terminal groups consisting predominantly of alcoholic hydroxyl groups and having a hydroxyl value between about 20 and about 80 with an excess of from about 20 to about 250 per cent of an organic diisocyanate whose sole reactive groups are isocyanate groups, said excess being calculated on the amount necessary for combining said isocyanate groups with said hydroxyl groups, with (b) an amount at least equivalent to the free isocyanate groups present in (a) of a polyfunctional compound whose sole reactive groups are at least two radicals selected from the class consisting of alcoholic hydroxyl and primary and secondary amino groups, with (2) an organic polyisocyanate whose sole reactive groups are at least two isocyanate groups, and then molding the mixture in a heated press.

2. A process as claimed in claim 1, wherein an an excess of about 50 to about 100 per cent of the organic diisocyanate is used in the production of (a).

3. A process as claimed in claim 1, wherein the organic diisocyanate is selected from the group consisting of napththylene and tolpylene diisocyanates.

4. A process as claimed in claim 1, wherein the polyfunctional compound (b) is selected from the group consisting of aminoethanol and a toluylene diamine.

5. A process as claimed in claim 1, wherein the initial polycondensation product is an adipic acid-glycol-polyester.

6. A process as claimed in claim 1, wherein the polyisocyanate (2) that is admixed with the unvulcanized elastomer (1) is selected from the group consisting of naphthylene and toluylene diisocyanates.

7. A process as claimed in claim 1, wherein the amount of the polyisocyanate (2) that is admixed with the unvulcanized elastomer (1) lies within the range of from about 2 per cent to about 6 per cent by weight of the latter.

8. A process as claimed in claim 1, wherein the molding step is conducted at temperatures of approximately 150° C. to 160° C. for a period of approximately 15 to 20 minutes.

9. A shaped, vulcanized elastomer obtained by the process claimed in claim 1.

10. A shaped, vulcanized elastomer obtained by the process claimed in claim 3.

11. A shaped, vulcanized elastomer obtained by the process claimed in claim 5.

12. A process as claimed in claim 1, wherein the substantially linear dicarboxylic acid-dihydric alcohol-polycondensation product has a hydroxyl value between 40 and 60.

FRIEDRICH WILHELM SCHMIDT.
KARL ERWIN MÜLLER.

REFERENCES CITED

The following references are of record in the file of this patent:

UNITED STATES PATENTS

| Number | Name | Date |
| --- | --- | --- |
| 2,333,639 | Christ et al. | Nov. 9, 1943 |
| 2,424,885 | Buist et al. | July 29, 1947 |
| 2,430,479 | Pratt et al. | Nov. 11, 1947 |